United States Patent
Rodriguez et al.

(10) Patent No.: US 8,113,308 B2
(45) Date of Patent: Feb. 14, 2012

(54) INTEGRATED ELECTRIC MOTOR DIFFERENTIAL FOR HYBRID ELECTRIC VEHICLES

(75) Inventors: Fernando Rodriguez, Hammond, IN (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 613 days.

(21) Appl. No.: 12/217,221

(22) Filed: Jul. 2, 2008

(65) Prior Publication Data
US 2010/0000807 A1 Jan. 7, 2010

(51) Int. Cl.
*B60K 6/445* (2007.10)
*B60K 1/00* (2006.01)
(52) U.S. Cl. .................. 180/65.235; 180/65.6; 180/65.7
(58) Field of Classification Search .................. 180/65.1, 180/65.21, 65.22, 65.225, 65.235, 65.245, 180/65.6, 65.7
See application file for complete search history.

(56) References Cited

U.S. PATENT DOCUMENTS

| 5,847,470 | A  | * | 12/1998 | Mitchell | 290/45 |
|---|---|---|---|---|---|
| RE36,678 | E  | * | 5/2000 | Moroto et al. | 180/65.23 |
| 7,410,017 | B2 | * | 8/2008 | Gradu | 180/65.6 |
| 7,455,612 | B2 | * | 11/2008 | Teraoka | 475/151 |
| 7,559,390 | B2 | * | 7/2009 | Marsh et al. | 180/65.6 |
| 7,832,514 | B2 | * | 11/2010 | Janson | 180/65.6 |
| 2001/0004948 | A1 | * | 6/2001 | Ruppert et al. | 180/65.6 |
| 2001/0013702 | A1 | * | 8/2001 | Yanase et al. | 290/40 C |
| 2003/0042053 | A1 | * | 3/2003 | Yoshikawa et al. | 180/65.1 |
| 2003/0196842 | A1 | * | 10/2003 | Hashimoto | 180/65.1 |
| 2004/0142790 | A1 | * | 7/2004 | Tomura et al. | 477/2 |
| 2007/0163819 | A1 | * | 7/2007 | Richter et al. | 180/65.2 |
| 2007/0213163 | A1 | * | 9/2007 | Combes et al. | 475/100 |
| 2009/0223725 | A1 | * | 9/2009 | Rodriguez et al. | 180/65.21 |

* cited by examiner

*Primary Examiner* — John R Olszewski
(74) *Attorney, Agent, or Firm* — Pauley Petersen & Erickson

(57) ABSTRACT

An electro-mechanical drive train for a hybrid electric vehicle. The electro-mechanical drive train includes a housing and a pinion shaft having a first end disposed within the housing and a second end in communication with a combustion engine. A differential is disposed within the housing and in combination with the end of the pinion shaft. An electric motor is also disposed within the housing and in actuating combination with the pinion shaft.

17 Claims, 2 Drawing Sheets

INTEGRATED ELECTRIC MOTOR DIFFERENTIAL FOR HYBRID ELECTRIC VEHICLES

BACKGROUND OF THE INVENTION

This invention relates generally to hybrid electric vehicles and, more particularly, to electro-mechanical drive trains for hybrid electric vehicles.

Hybrid electric vehicles are vehicles with more than one propulsion power source. Typically, one of the power sources is an electro-mechanical device, e.g., an electric machine or motor, which is teamed with the other power source, e.g., a combustion engine. The electric machine is coupled to the combustion engine to form the vehicle drive train. Common drive train topologies are shown in FIGS. 1 and 2. In FIG. 1, the combustion engine 20 and the electric machine 22 are integrated into one system ahead of the transmission 24. FIG. 2 illustrates a topology were the electric machine 22 is placed between the transmission 24 and the differential 26. In the drive train of FIG. 2, the output power of the engine travels through the transmission before it combines with the electric machine. The combined power arrives at the wheels via the differential 26. In the topologies of FIGS. 1 and 2, the electric machine propulsion power commonly travels to the differential via a u-joint in front of the differential. U-joints introduce a source of undesirable power loss for any power passing therethrough.

In FIGS. 1 and 2, the drive trains are illustrated as rear-wheel drive trains, but are not so limited. Front-wheel drive vehicles also have drive trains that can incorporate the electric machine before or after the transmission, and before a differential.

There is a need for an improved electromechanical drive train for a hybrid electric vehicle that reduces power losses during transfer to a differential.

SUMMARY OF THE INVENTION

A general object of the invention is to provide an improved electromechanical drive train for a hybrid electric vehicle or a plug-in hybrid electric vehicle.

A more specific objective of the invention is to overcome one or more of the problems described above.

The general object of the invention can be attained, at least in part, through an electro-mechanical drive train for a hybrid electric vehicle that includes a differential and an electric motor disposed within a common housing.

The invention further comprehends an electro-mechanical drive train for a hybrid electric vehicle. The electro-mechanical drive train includes a housing, and a pinion shaft having an end disposed within the housing. A differential is disposed within the housing and in combination with the end of the pinion shaft. An electric motor is also disposed within the housing and in actuating combination with the pinion shaft.

The invention still further comprehends a vehicle including the electro-mechanical drive train of this invention.

As used herein, references to "hybrid electric vehicle" are to be understood to include, without limitation, plug-in electric vehicles.

Further, references herein to "integrated differential" are to be understood to refer to a differential according to this invention that includes or is combined with an electric motor for providing power to the wheels of a vehicle.

Other objects and advantages will be apparent to those skilled in the art from the following detailed description taken in conjunction with the appended claims and drawings.

DETAILED DESCRIPTION OF THE INVENTION

The present invention provides the integration of an electric machine with a differential for use in providing electric power to the wheels of a hybrid electric vehicle. The integrated electro-mechanical drive train of this invention provides a more compact and efficient system, as compared to having a separate electric machine upstream from the differential in a vehicle. The integrated electro-mechanical drive train of this invention can incorporate various and alternative electric motors with various and alternative types of differentials, depending on need. The electric machine of this invention can be selected from standard AC and DC machines as well as any advanced pseudo AC/DC machines. Exemplary types of differentials for use with or in the integrated electro-mechanical drive train of this invention include, without limitation, open differentials, limited slip differentials, a viscous coupling differentials, locking differentials, and torque sensing differentials (e.g. TORSEN differentials). The invention will be described below with reference to an open differential in a rear wheel drive vehicle.

Figure 3:
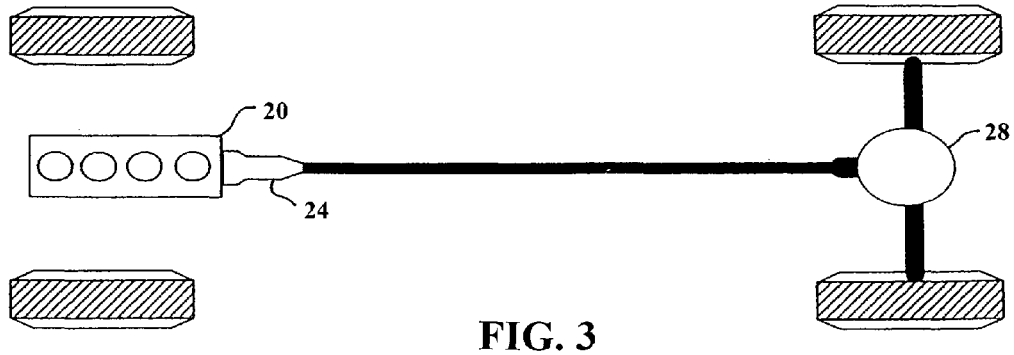
FIG. 3 generally illustrates an integrated electro-mechanical drive train of a hybrid electric vehicle, according to one embodiment of this invention.

FIG. 3 illustrates an integrated electro-mechanical drive train according to one embodiment of this invention. In FIG. 3, the engine 20 and transmission 24 are located near the front of the rear-wheel drive vehicle, and the electric machine is combined with the differential to form the integrated differential 28. Combustion engine propulsion power travels through the transmission 26, and is combined with the propulsion power produced by the integrated differential 28, and then sent to the wheels via the integrated differential 28.

Figure 4:
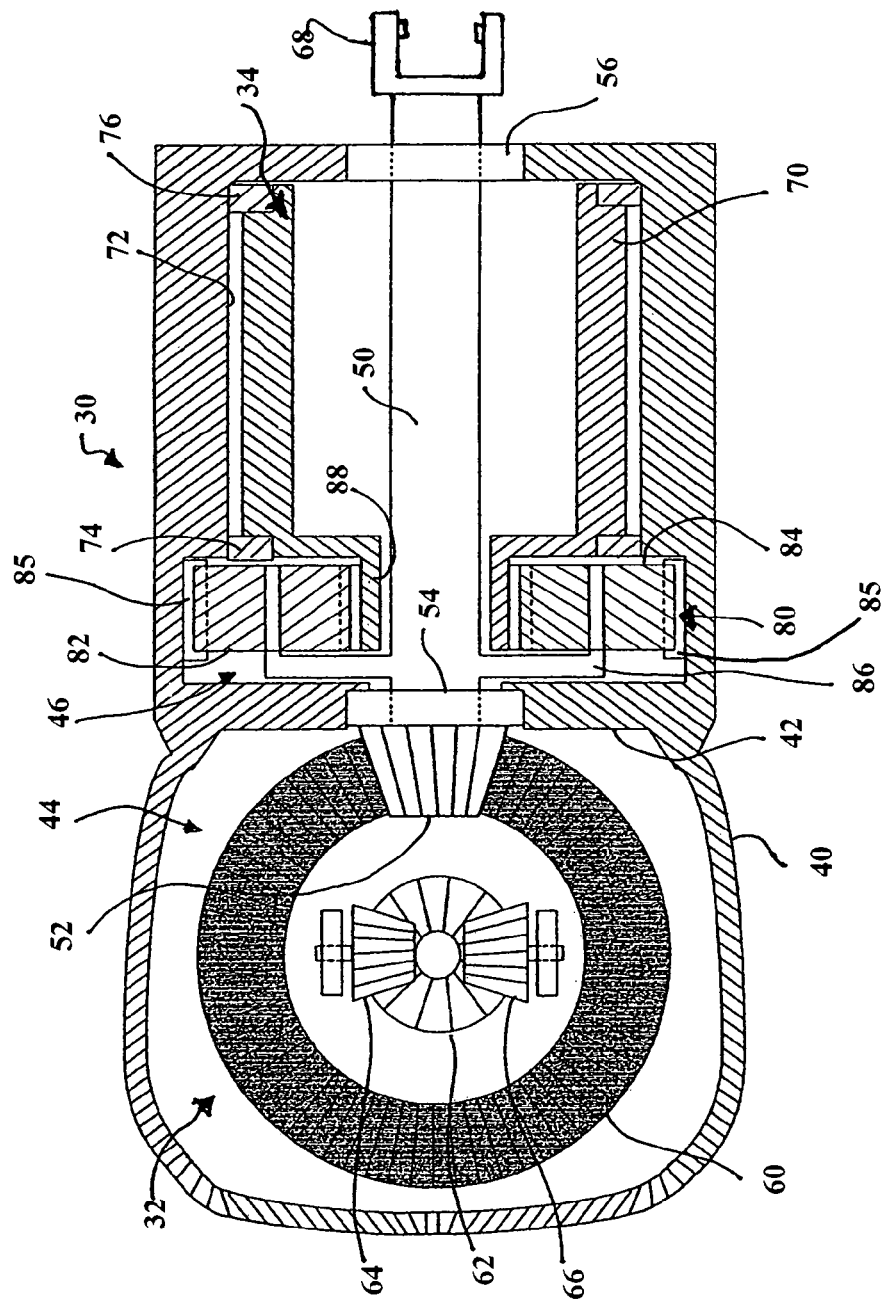
FIG. 4 is a partial sectional view of portion of an electro-mechanical drive train of a hybrid electric vehicle, according to another embodiment of this invention.

FIG. 4 is a partial sectional view of an integrated differential 30 for an electro-mechanical drive train of a hybrid electric vehicle, according to one embodiment of this invention. The integrated differential 30 includes a differential 32 and an electric machine, embodied as electric motor 34. The differential 32 and the electric motor 34 are disposed within a common housing 40. In the embodiment shown in FIG. 4, the housing 40 is divided by a wall 42 into a first chamber 44 and a second chamber 46. The differential 32 is disposed in the first chamber 42 and the electric motor 34 is disposed in the second chamber 44. As will be appreciated by those skilled in the art following the teachings herein provided, various and alternative sizes, shapes, and configurations are available for the housing 40, depending on need and the size, shape, and configuration of the differential, electric motor, and vehicle to which the housing is attached. For example, the common housing 40 can be embodied as two separate sub-housings, one for each of the differential 32 and electric motor 34, which are attached together or otherwise held adjacent when connected to the vehicle.

A pinion shaft 50 of the electro-mechanical drive train extends into the housing 40. The pinion shaft 50 extends through the second chamber 46 and into the first chamber 44. A pinion gear 52 is disposed at the end of the pinion shaft 50 within the first chamber 44. The pinion shaft 50 extends through two bearings 54 and 56 disposed between the pinion shaft 50 and the housing 40, thereby allowing the pinion shaft 50 to turn within the housing 40. The bearings 54 and 56, as well as other bearings discussed below, can be any suitable bearing, and can be sealed according to known methods, such as to avoid leakage of differential fluid.

The pinion gear 52 has gear teeth that correspondingly match or fit gear teeth of a ring gear 60 of the differential 32. The gearing between the pinion gear 52 and the ring gear 60 causes the ring gear 60 to turn upon the rotation of the pinion gear 52. The differential 32 is in combination with two axle shafts, where each axle shaft extends from the differential 32 to one of the two rear wheels. A side gear, such as side gear 62, is connected to an end of each of the axle shafts. As shown in FIG. 4, the side gear 62 has gear teeth that correspond to gear teeth on two axle pinions gears 64 and 66. Each of the two axle pinion gears 64 and 66 are connected to the ring gear 60 and in combination with the side gear 62, such that upon the turning of the ring gear 60, the pinion gears 64 and 66 cause the pinion gear 62 and the axle shaft to turn.

An end of the pinion shaft 50 opposite the pinion gear 52 includes a u-joint connector 68. The u-joint connector 68 forms a universal joint, or u-joint, with a second u-joint connector (not shown). Such u-joints are commonly used in vehicle drive trains to connect one or more portions of a drive shaft. The u-joint allows for one or more further shaft portions to run between the u-joint and the transmission and combustion engine, such as shown in FIG. 3. The combustion engine is able to rotate the shaft which causes the pinion shaft 50 to also rotate. The integrated differential 30 of this invention provides a desirable placement of the electric motor 34 rearward of the differential u-joint connector 68. As will be appreciated, the invention is not limited to the use of a universal joint as shown in FIG. 4. The invention can be incorporated without using a u-joint, or with other types of joints, such as constant velocity (CV) joints.

The electric motor 34 is desirably a permanent magnet machine (though an induction machine or any other type of electric machine can be used) that includes a rotor 70 disposed around and in actuating combination with the pinion shaft 50 within the housing 40. The electric motor 34 also includes a stator 72 fixed to an inside surface of the housing 40 and disposed around the rotor 70.

As known in the art, such as in brushless permanent magnet motors, a plurality of magnets on the rotor 70 are used in combination with a plurality of windings on the stator 72 to power the electric motor 34 to rotate the pinion shaft 50 upon receiving an electrical current or, alternatively, to generate electrical current through rotation of the pinion shaft 50 by the combustion engine or during braking. The electric motor 34 is connected to a battery system, such as are known for use in hybrid vehicles. The battery system provides the power to drive the electric motor 34 to rotate the pinion shaft 50 and power the vehicle during, for example, vehicle acceleration. In a generation mode or a regeneration mode, the electric motor 34 produces an electrical current that charges the battery system. In one embodiment, the stator windings are fed by a power controller, such as a DC-AC converter, which controls the voltage, current, and frequency that are supplied to the electric motor 34, thereby controlling the speed and torque of the electric motor 34.

In the embodiment shown in FIG. 4, the stator is integrated with the housing 40. Two bearings 74 and 76 are disposed between the stator 72 and the rotor 70, thereby keeping the rotor 70 in position between the pinion shaft 50 and the stator 72, and allowing the cylindrical rotor 70 to rotate around the pinion shaft 50. The power of the rotating rotor 70 is transferred to the pinion shaft 50 using planetary gear system 80. Planetary gear system 80 includes more than one planet gear, such as planet gears 82 and 84 in FIG. 4, connected to a planet carrier 86. The planet carrier 86 is connected to the pinion shaft 50, such that rotation of the planet carrier 86 causes rotation of the pinion shaft 50, and vice versa.

Each of the planet gears 82 and 84 have gear teeth that correspondingly match and operate with both gear teeth on the inside surface of the housing 40 and gear teeth on a reduced diameter portion 88 of the rotor 70. The portion 88 of the rotor acts as a sun gear and the toothed inside surface of the housing acts as a ring gear 85. As the ring gear 85 on the housing 40 is stationary, the rotation of the rotor 70 causes the rotation of the planet gears 82 and 84, which causes the rotation of the pinion shaft 50. When the electric motor 34 is not powered, a rotating pinion shaft 50 rotates the planet carrier 86, which rotates the planet gears 82 and 84, which in turn rotate the rotor 70, such as to generate electrical power for charging the battery. As will be appreciated by those skilled in the art following the teachings herein provided, various sizes and configurations are available for the rotor, stator, and gears of the planetary gear system. For example, various numbers of planetary gears can be used depending on need. Also, like the stator 72, the ring gear 85 of the housing 40 can be integrated with the housing or be a separate and attached ring gear.

Figure 1:
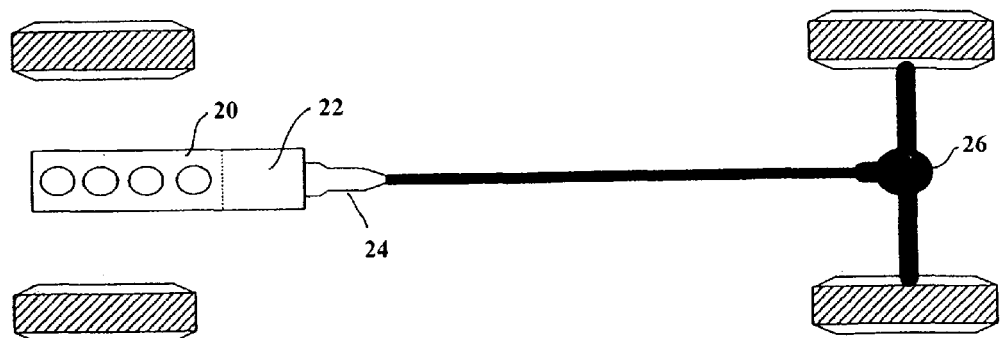
FIGS. 1 and 2 generally illustrate common drive train topologies for current hybrid electric vehicles.
Figure 2:
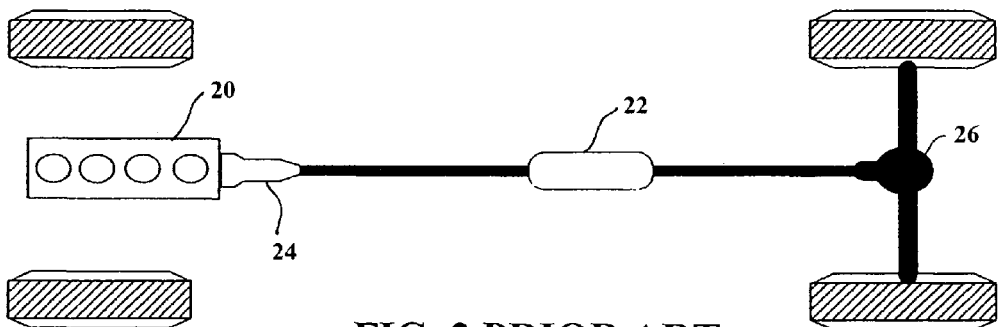

The integration of the electric machine and the differential according to this invention provides benefits including weight reduction and increased efficiency. Weight is reduced because of shared components, such as the housing. As a further example, weight can be further reduced by using the pinion shaft as the rotor for the electric machine. Power efficiency is increased, for example, due to a new flow of power. As discussed above with reference to FIGS. 1 and 2, the propulsion power produced by the electric machine typically travels to the differential via a u-joint. U-joints introduce a source of power loss for any power traveling therethough. In this invention, the power flows directly from the integrated differential to the wheels, thereby resulting in increased efficiency. A further advantage is provided by the use of the planetary gear system shown in FIG. 4. The planetary gear system can provide for a gear reduction between the rotor and the pinion shaft, depending on need.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An electro-mechanical drive train for a hybrid electric vehicle, comprising:
   a differential and an electric motor, disposed within a common housing;
   a pinion shaft including an end disposed within the common housing and an opposite end extending from the housing, the pinion shaft in combination with the differential and the electric motor, wherein the electric motor comprises a rotor in actuating combination with the pinion shaft within the housing and a stator fixed to the housing and disposed around the rotor, and wherein the differential comprises a pinion gear at the end of the pinion shaft and a ring gear coupled with the pinion gear; and a planet gear in combination with a planet carrier that is connected to the pinion shaft, wherein the planet gear engages both the rotor and a stationary ring gear fixed to or integrated with the housing.

2. The electro-mechanical drive train according to claim 1, wherein the differential is selected from the group consisting of an open differential, a limited slip differential, a viscous coupling differential, a locking differential, and a torque sensing differential.

3. The electro-mechanical drive train according to claim 1, further comprising an internal combustion engine in combination with the opposite end of the pinion shaft.

4. The electro-mechanical drive train according to claim 1, wherein the stator is integrated with the housing.

5. A vehicle comprising the electro-mechanical drive according to claim 1.

6. The electro-mechanical drive train according to claim 1, wherein the rotor comprises a reduced diameter portion and the planet gear engages the reduced diameter portion and the stationary ring gear.

7. An electro-mechanical drive train for a hybrid electric vehicle, comprising:
a housing;
a pinion shaft having an end disposed within the housing and an opposite end extending from the housing;
a differential disposed within the housing and in combination with the end of the pinion shaft;
an electric motor disposed within the housing, the electric motor comprises a rotor in actuating combination with the pinion shaft within the housing and a stator fixed to or integrated with the housing and disposed around the rotor; and
a plurality of planet gears in combination with a planet carrier that is connected to the pinion shaft, wherein the planet gears engage both the rotor and a stationary ring gear fixed to or integrated with the housing.

8. The electro-mechanical drive train according to claim 7, wherein the differential comprises a pinion gear at the end of the pinion shaft and a ring gear in combination with the pinion gear.

9. The electro-mechanical drive train according to claim 8, further comprising two axle shafts in combination with the differential.

10. The electro-mechanical drive train according to claim 9, wherein the differential further comprises two side gears, each of the side gears attached to an end of one of the two axle shafts, and two axle pinion gears, each of the two axle pinion gears connected to the ring gear and in combination with the two side gears.

11. The electro-mechanical drive train according to claim 7, wherein the housing is divided into a first chamber and a second chamber, wherein the differential is disposed in the first chamber and the electric motor is disposed in the second chamber.

12. The electro-mechanical drive train according to claim 7, wherein the differential is selected from the group consisting of an open differential, a limited slip differential, a viscous coupling differential, a locking differential, and a torque sensing differential.

13. The electro-mechanical drive train according to claim 7, further comprising an internal combustion engine in combination with the opposite end of the pinion shaft.

14. A vehicle comprising the integrated electro-mechanical drive train according to claim 13.

15. The electro-mechanical drive train according to claim 7, wherein the rotor comprises a reduced diameter portion and the planet gears engage the reduced diameter portion and the stationary ring gear.

16. An electro-mechanical drive train for a hybrid electric vehicle, comprising:
a housing;
a pinion shaft having an end disposed within the housing and an opposite end extending from the housing;
a differential disposed within the housing and in combination with the end of the pinion shaft;
an electric motor adjacent the differential, the electric motor comprises a rotor in actuating combination with the pinion shaft within the housing and a stator fixed to or integrated with the housing and disposed around the rotor; and
a plurality of planet gears in combination with a planet carrier that is connected to the pinion shaft, wherein the planet gears engage both the rotor and a stationary ring gear fixed to or integrated with the housing.

17. The electro-mechanical drive train according to claim 16, wherein the rotor comprises a reduced diameter portion and the planet gears engage the reduced diameter portion and the stationary ring gear.

\* \* \* \* \*